United States Patent
Kwark

(10) Patent No.: US 9,827,825 B2
(45) Date of Patent: Nov. 28, 2017

(54) SYSTEM FOR DETECTING OCCUPANT IN VEHICLE AND METHOD FOR CONTROLLING AIR CONDITIONING USING THE SAME

(71) Applicant: HYUNDAI MOTOR COMPANY, Seoul (KR)

(72) Inventor: Chang Kiun Kwark, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 148 days.

(21) Appl. No.: 14/843,980

(22) Filed: Sep. 2, 2015

(65) Prior Publication Data

US 2016/0114650 A1 Apr. 28, 2016

(30) Foreign Application Priority Data

Oct. 28, 2014 (KR) .................. 10-2014-0147140

(51) Int. Cl.

| | |
|---|---|
| *B60H 1/00* | (2006.01) |
| *B60R 25/01* | (2013.01) |
| *B60R 25/20* | (2013.01) |
| *B60N 2/00* | (2006.01) |
| *B60R 25/04* | (2013.01) |
| *B60R 16/037* | (2006.01) |
| *B60R 21/015* | (2006.01) |
| *F24F 11/00* | (2006.01) |

(52) U.S. Cl.
CPC ......... *B60H 1/00742* (2013.01); *B60N 2/002* (2013.01); *B60R 16/037* (2013.01); *B60R 21/015* (2013.01); *F24F 11/0034* (2013.01); *F24F 2011/0035* (2013.01)

(58) Field of Classification Search
CPC ............ B60H 1/00742; B60H 1/00642; B60N 2/5628; B60N 2/002; B60W 10/30; B60R 21/015; B60R 16/037; F24F 11/0034; F24F 2011/0035
See application file for complete search history.

(56) References Cited

U.S. PATENT DOCUMENTS

| | | | |
|---|---|---|---|
| 6,454,178 B1 * | 9/2002 | Fusco ................ | B60H 1/00742 165/203 |
| 2004/0220705 A1 * | 11/2004 | Basir ..................... | B60N 2/002 701/1 |
| 2006/0187038 A1 * | 8/2006 | Shieh ...................... | G01B 7/14 340/562 |

(Continued)

FOREIGN PATENT DOCUMENTS

| | | | |
|---|---|---|---|
| EP | 0419722 B1 * | 12/1992 | ......... B60H 1/00742 |
| IL | WO 2014072972 A1 * | 5/2014 | ............ B60N 2/002 |

(Continued)

*Primary Examiner* — Thomas G Black
*Assistant Examiner* — Sara Lewandroski
(74) *Attorney, Agent, or Firm* — McDermott Will & Emery LLP

(57) ABSTRACT

A system for detecting an occupant in a vehicle includes a proximity sensor installed at a back of a seat and detecting an object. An automotive key locks and unlocks a door. A starter starts and stops an engine of the vehicle. A controller is configured to determine whether the occupant is in the seat based sensor values of the proximity sensor, a door unlock signal from the automotive key, and a starting signal from the starter.

17 Claims, 4 Drawing Sheets

(56) References Cited

U.S. PATENT DOCUMENTS

| | | | | |
|---|---|---|---|---|
| 2011/0115500 A1* | 5/2011 | Stanley | ................. | B60N 2/002 |
| | | | | 324/661 |
| 2011/0295466 A1* | 12/2011 | Ostu | ..................... | B60N 2/002 |
| | | | | 701/45 |
| 2012/0050021 A1* | 3/2012 | Rao | ....................... | B60N 2/002 |
| | | | | 340/425.5 |
| 2013/0325259 A1* | 12/2013 | Kwon | ................ | B60H 1/00642 |
| | | | | 701/36 |
| 2014/0125355 A1* | 5/2014 | Grant | .................... | B64D 11/06 |
| | | | | 324/629 |
| 2016/0031342 A1* | 2/2016 | Camello | ............... | B60N 2/002 |
| | | | | 701/45 |

FOREIGN PATENT DOCUMENTS

| | | | | |
|---|---|---|---|---|
| JP | 10278564 A | * | 10/1998 | ......... B60H 1/00742 |
| JP | 2000-306462 A | | 11/2000 | |
| JP | 2010-023695 A | | 2/2010 | |
| JP | 2011-075405 A | | 4/2011 | |
| JP | 2014-113962 A | | 6/2014 | |
| KR | 10-1996-0007222 A | | 3/1996 | |
| KR | 10-0134416 B1 | | 4/1998 | |
| KR | 10-2012-0023409 A | | 3/2012 | |
| KR | 10-1394771 B1 | | 5/2014 | |
| WO | 0038957 A1 | | 7/2000 | |

* cited by examiner

US 9,827,825 B2

SYSTEM FOR DETECTING OCCUPANT IN VEHICLE AND METHOD FOR CONTROLLING AIR CONDITIONING USING THE SAME

CROSS-REFERENCE TO RELATED APPLICATION

This application claims under 35 U.S.C. §119(a) the benefit of priority to Korean Patent Application No. 10-2014-0147140 filed on Oct. 28, 2014, the entire content of which is incorporated herein by reference.

TECHNICAL FIELD

The present disclosure relates to a system for detecting an occupant in a vehicle and a method for controlling air conditioning using the system. More particularly, the present disclosure relates to a system for determining whether an occupant is in a seat, a position of the occupant, and the number of the occupant and a method for controlling individual air-conditioning using the system.

BACKGROUND

A vehicle is equipped with a heating, ventilating, and air conditioning (HVAC) system for controlling an interior temperature and for a pleasant interior of the vehicle.

Recently, the vehicle uses a full automatic temperature control (FATC) system that provides a pleasant environment by automatically controlling the interior temperature according to a temperature set by a user.

In the FATC system, when the user sets a temperature in order to control the interior temperature of the vehicle, an air conditioning controller or a FATC controller receives detection signals from a solar radiation sensor for detecting solar radiation, an external temperature sensor for detecting a temperature of external air and an interior temperature sensor for detecting the interior temperature of the vehicle. The air conditioning controller then calculates an interior thermal load based on sensing values from the sensors, and determines a discharge mode, a discharge temperature, a discharge direction, and a discharge amount in consideration of an air-conditioning load corresponding to the interior thermal load.

The air-conditioning controller controls the interior temperature and operation of the system and receives the sensing values from a discharge temperature sensor detecting discharge temperature. A heater temperature sensor detects the temperature of an electric heater, for example, a PTC heater, (usually, an auxiliary heater in a vehicle with an internal combustion engine and a main heater in an electric vehicle). An evaporator temperature sensor detects the temperature of an evaporator and controls related parts such as a mode actuator, a temperature door (temperature control door) actuator, a wind direction control actuator, an air-conditioning blower, a compressor, and an electric heater so that air for air-conditioning is supplied in accordance with the determined discharge mode, discharge temperature, discharge direction, and discharge mount.

A technology of individually conditioning air in divided spaces inside a vehicle has been known in the art, and in relation to such individual air-conditioning in a vehicle.

Such automotive individual air-conditioning has to determine whether there is an occupant seated in a vehicle and a position of the occupant in the vehicle. A buckle switch sensor outputting signals, depending on whether the occupant fastens his/her seatbelt, or a mat sensor installed in a seat cushion of a seat is generally used in the related art for detecting whether the occupant is in the seat and the position of the occupant.

However, the mat sensor is provided only at a left rear-seat and a right rear-seat in the vehicle, and thus, it cannot determine the exact position of the occupant positioned between the left and right rear-seats or not seated.

When the mat sensor detects weight of the occupant or a pressure depending on a sitting position of the occupant, it recognizes objects such as packages or goods as occupants, so that it is impossible to discriminate between occupants and objects for individual air-conditioning.

The buckle switch sensor and the mat sensor for rear-seats are expensive and large in weight, thus deteriorating performance of the vehicle such as fuel efficiency.

Unlike a vehicle with an internal combustion engine using power from the engine and used heat for cooling/heating, an electric vehicle is equipped with an electric heater and an electric compressor that use power from a battery, and thus, the mileage by one-time charging is considerably reduced by unnecessary power consumption by an air conditioning system.

In the electric vehicle, the air conditioning system consumes a large amount of electric energy, and thus, a need exits to measure the energy consumption.

The above information disclosed in this Background section is only for enhancement of understanding of the background of the invention, and therefore, it may include information that does not form the prior art that is already known in this country to a person of ordinary skill in the art.

SUMMARY OF THE DISCLOSURE

The present disclosure has been made in an effort to solve the above-described problems associated with prior art.

An aspect of the present inventive concept provides a system for detecting an occupant which can solve the problems with buckle switches or mat switches of the related art by determining whether the occupant in a seat, a position of the occupant, and the number of occupants, using a simple sensor.

Another aspect of the present inventive concept provides an air-conditioning method that can prevent unnecessary power consumption by individually conditioning air for a driver seat, a passenger seat, and a rear-seat in accordance with a detection result on whether an occupant is in a seat, a position of the occupant, and the number of occupants.

According to an exemplary embodiment of the present inventive concept, a system for detecting an occupant in a vehicle includes a proximity sensor installed at a back of a seat and detecting an object. An automotive key locks and unlocks a door. A starter starts and stops an engine of the vehicle. A controller is configured to determine whether the occupant is in the seat based on sensor values of the proximity sensors, a door unlock signal from the automotive key, and a starting signal from the starter.

According to another exemplary embodiment of the present inventive concept, a method for controlling automotive air-conditioning of a vehicle by determining whether an occupant is in a seat comprises receiving a door unlock signal from an automotive key and a starting signal from a starter by a controller. The individual air-conditioning is performed when the occupant is in the seat.

According to the present disclosure, it is possible to determine whether there is an occupant in a seat, the position of the occupant, and the number of occupants in a vehicle by analyzing sensor values of an inexpensive, light, and small-sized proximity sensor, and to solve the problems with buckle switches or mat sensors of the related art, and thus, it is possible to reduce cost and weight and improving fuel efficiency.

Further, according to a system for detecting an occupant and method for the same of the present disclosure, it is possible to perform individual air-conditioning for a driver seat, a passenger seat, and a rear-seat in accordance with a determination result on whether the occupant is in a seat, a position of the occupant, and the number of occupants, thus providing efficient air-conditioning and preventing unnecessary power consumption.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
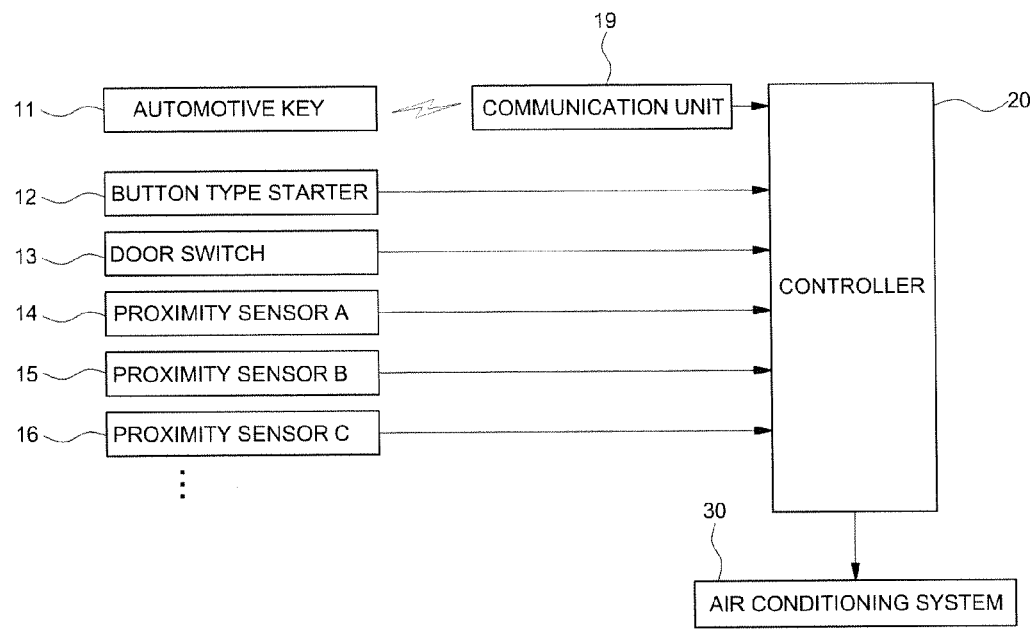
FIG. 1 is a block diagram illustrating a configuration of a system for detecting an occupant in a vehicle according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the invention as defined by the appended claims.

Hereinafter, the present disclosure will be described more fully with reference to the accompanying drawings for those skilled in the art to easily implement the present disclosure.

The present disclosure provides an automotive system for detecting an occupant, which can determine whether the occupant in a seat, a position of the occupant, and the number of occupants, using simple sensors.

The present disclosure uses a proximity sensor installed at a back of a seat in a vehicle for sensing an object as an occupant detecting unit that is configured to detect the occupant in the vehicle. The proximity sensor may be provided in a rear-seat or both in a passenger seat and the rear-seat.

In addition to the proximity sensor, a key (Fob) and a starter for a smart key system or a keyless entry system are used herein.

The starter may be a button for a driver to start and stop an engine by simply pressing the button.

Figure 2:
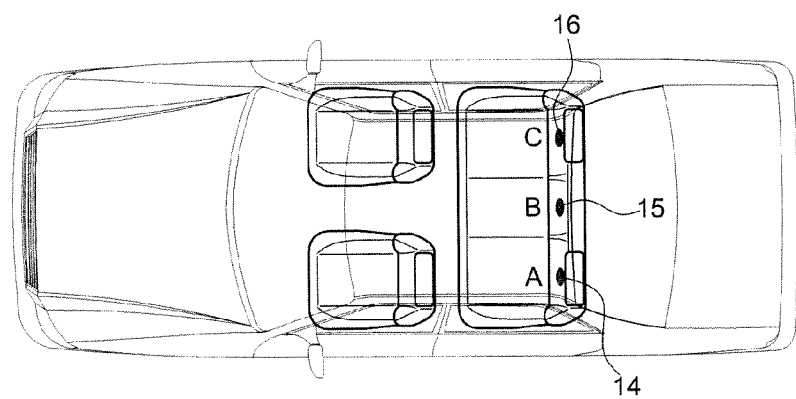
FIGS. 2 and 3 are diagrams illustrating a position of a proximity sensor at a rear-seat of a system for detecting an occupant in a vehicle according to the present disclosure.
Figure 3:
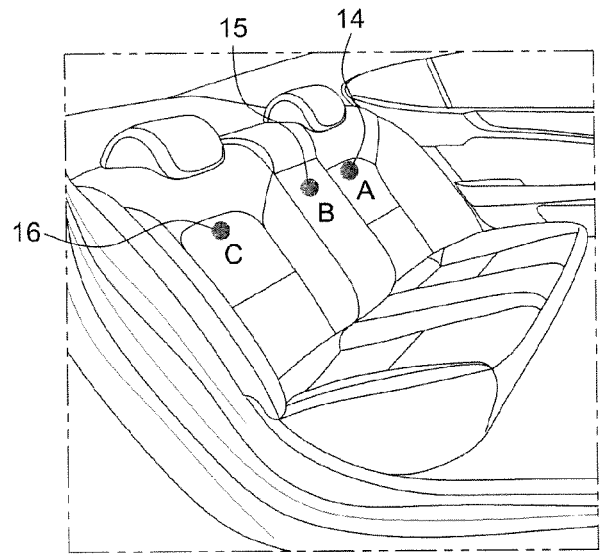

FIG. 1 is a block diagram illustrating a configuration of a system for detecting an occupant in a vehicle according to the present disclosure, and FIGS. 2 and 3 are diagrams illustrating a position of a proximity sensor at a rear-seat of a system for detecting an occupant in a vehicle according to the present disclosure.

Individual air-conditioning herein may refer to individual air-conditioning for a driver seat, a passenger seat, and a rear-seat.

For example, when only a driver is in the driver seat of a vehicle, air-conditioning is performed only for the driver seat, and when the driver the driver seat and an occupant in the passenger seat are in the vehicle, the air-conditioning is performed only for the driver seat and the passenger seat. Further, when the driver the driver seat and the occupant in the rear-seat are in a vehicle, the air-conditioning is performed only for the driver seat and the rear-seat.

When the driver the driver seat and the occupants in the passenger seat and the rear-seat are in the vehicle, the air-conditioning is performed for all of the driver seat, the passenger seat, and the rear-seat.

In the following description, it is exemplified that proximity sensors 14, 15, and 16 are disposed in the rear-seat, and thus, the air-conditioning is individually performed for the rear-seat, based on detection result of the occupant in the rear-seat.

It should be noted that air-conditioning control may be performed for the passenger seat in the same way for the rear-seat, and though not described herein, a proximity sensor may be disposed in the passenger seat to perform the individual air-conditioning control (individual air-conditioning on/off control and air amount control) to the passenger seat in accordance with detecting whether the passenger is in the passenger seat.

Referring to FIGS. 2 and 3, the proximity sensors 14, 15, and 16 are spaced apart from each other at a predetermined distance in the rear-seat.

For example, the three proximity sensors 14, 15, and 16 for detecting an object are disposed in the left, middle, and right of the rear-seat.

The proximity sensors 14, 15, and 16 for the rear-seat are indicated by A, B, and C in FIGS. 1 to 3.

The proximity sensors 14, 15, and 16 detect the object within a predetermined coverage (for example, 10 cm) and output an electrical signal (detection signal) when they detect the object.

For example, when the proximity sensors 14, 15, and 16 detect the object within the coverage, a signal value (sensor value) output from them is 1 when there is the object, and it is 0 when there is no object.

The proximity sensors 14, 15, and 16 are disposed at a height corresponding to a back of an adult at an upper portion of the rear-seat to detect the object, and thus, they cannot detect the object under their positions and do not misrecognize the object such as briefcases in the rear-seat as the occupant.

In the present disclosure, a controller 20 is configured to receive output signals (detection signals) from the proximity sensors 14, 15, and 16, to receive a lock/unlock signal from an automotive key 11 through a communicator 19, and to receive starting/stopping signals from an automotive starter 12.

The controller 20 may be an air-conditioning controller that can determine whether to perform air-conditioning for the driver seat, the passenger seat, and the rear-seat, turn on/off individual air-conditioning, and control the amount of air for the driver seat, the passenger seat, and the rear-seat.

The air-conditioning controller controls an air conditioning system 30 for individual air-conditioning, and when a body control module (BCM) manages the process of detecting and determining of occupants, the controller 20 may include the air-conditioning controller and the BCM, and thus when the BCM detects the occupant in the vehicle, the air-conditioning controller controls the air conditioning system 30 in response to a control order according to the detection result.

The automotive key 11 outputs a lock signal and an unlock signal when the driver operates a locking button (switch) and an unlock button, respectively, and the controller 20 wirelessly receives the signals from the automotive key 11 through the communicator 19.

When the automotive starter 12 is a button type starter 12, the controller 20 receives starting/stopping signals generated from the button type starter 12.

The controller 20 receives a signal from a door switch 13 for sensing rear doors opening/closing and recognizes a door open based on the signal from the door switch 13.

Although the door switch 13 is disposed on the rear door, it may be disposed on a front passenger door for individual air-conditioning for the passenger seat.

Accordingly, the controller 20 may determine whether there is the occupant, the positions of the occupant, and the number of occupants in the vehicle on the basis of the unlock signal of the automotive key 11, the starting signal, a door open signal from the door switch 13, and the sensor values from the proximity sensors 14, 15, and 16.

In particular, when the unlock signal is input from the automotive key 11 or the starting signal is input from the button type starter 12, the controller 20 determines whether there is the occupant, the position of occupants, and the number of occupants in the rear-seat by generally and logically analyzing the sensor values when inputting from the proximity sensors 14, 15, and 16.

In detail, the controller 20 checks the sensor values from the proximity sensors 14, 15, and 16 for a predetermined period of time (for example, one second), when the unlock signal is input from the automotive key 11, in which if the sensor values from the proximity sensors 14, 15, and 16 are 0 (no object) and then changed to 1 when the starting signal is input from the button type starter 12, the controller 20 determines that there is an occupant in a seat with the proximity sensors 14, 15, and 16 and performs individual air-conditioning for the seat.

When the unlock signal is input from the automotive key 11, the controller 20 determines that the sensor values of the proximity sensors 14, 15, and 16 is 1 (object in the seats), that is, the object is detected, by checking the sensor values of the proximity sensors 14, 15, and 16. If the sensor values of the proximity sensors 14, 15, and 16 remain as 1 (keeping detecting an object), the controller 20 does not perform individual air-conditioning for the rear-seat when there is an object such as a kid car seat, not an occupant, in the backseat before a door is unlocked and open.

When a stopping signal is input with the previous sensor values of 1 (object in a seat) of the proximity sensors 14, 15, and 16 and then when the starting signal is input without the rear doors being open (by the door switch 13) and the sensor values 1 of the proximity sensors 14, 15, and 16 are not changed, the controller determines that there is the occupant in the rear-seat and performs individual air-conditioning.

When the lock signal is input from the automotive key 11, the controller 20 resets the sensor values of the proximity sensors 14, 15 and 16 to 0 and then detects the occupant at the point of time when the unlock signal is input.

For example, when only the driver is seated while an engine is stopped and then starts the vehicle, in which when the automotive key 11 does not operate for locking with an occupant in a rear-seat, the sensor value of the proximity sensors 14, 15, and 16 are not reset to 0, but maintained to be 1, so individual air-conditioning is performed for the rear-seat.

Figure 4A:
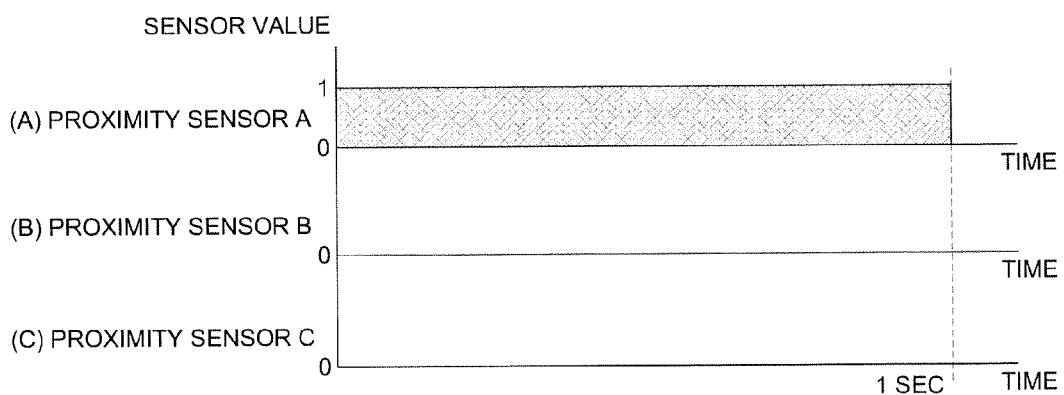
FIGS. 4A and 4B are views illustrating a method for detecting an occupant in a vehicle according to the present disclosure.
Figure 4B:
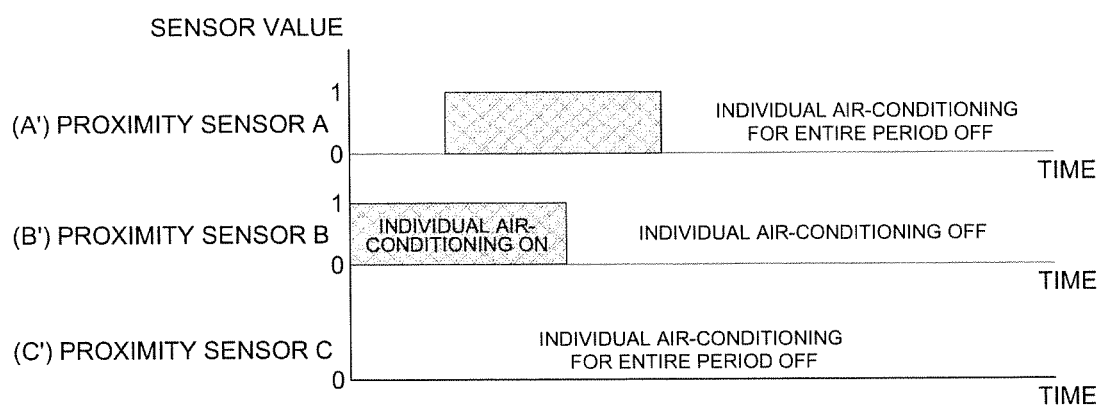

FIGS. 4A and 4B are diagrams illustrating a method of detecting an occupant, and FIG. 4A illustrates sensor values of the proximity sensors 14, 15, and 16 for a predetermined time (for example, one second) right after the automotive key 11 operates for door unlocking, in which only the sensor value of the proximity sensor (A) 14 is 1 (object detected).

FIG. 4B illustrates sensor values of the proximity sensors 14, 15, and 16 after an engine starts, in which the sensor value of the proximity sensors (A and B) 14 and 15 are 1 (object detected).

In the following description, the sensor value of the proximity sensor (A) 14 is indicated by A for a predetermined time after the automotive key 11 operates for door unlocking and the sensor value of the proximity sensor (A) 14 after the engine starts is indicated by A'.

Further, the sensor values of the proximity sensor (B) 15 are indicated by B and B' and the sensor values of the proximity sensor (C) 16 are indicated by C and C'.

First, as for A+A'=2 as in FIG. 4A, an object is detected before an occupant gets in a vehicle, the controller determines that there has been an object or a large thing (kid car seat) over the positions of the proximity sensors 14, 15, and 16 in the vehicle and does not perform individual air-conditioning for the rear-seat (individual air-conditioning for the rear-seat Off).

However, as for B+B'=0+1=1 as in FIG. 4B, there is no object while unlocking the door, then an object is detected after the vehicle starts, so that the controller 20 determines that there is an occupant and performs individual air-conditioning for the rear-seat (individual air-conditioning for the rear-seat On).

C+C=0 means that there is no occupant and object in the seat with the proximity sensor (C) 16.

As described above, when the sum (A+A') of the sensor values of the proximity sensor (A) 14, the sum (B+B') of the sensor values of the proximity sensor (B) 15, and the sum (C+C') of the sensor values of the proximity sensor (C) 16 are all 0, or at least any one of them is 2, the controller 20 determines that there is no occupant and object or there is always an object in the vehicle and does not perform individual air-conditioning for the rear-seat (individual air-conditioning for the rear-seat Off).

When at least any one of the sum (A+A') of the sensor values of the proximity sensor (A) 14, the sum (B+B') of the sensor values of the proximity sensor (B) 15, and the sum (C+C') of the sensor values of the proximity sensor (C) 16 is 1, the controller 20 determines that there is an occupant in the rear-seat with the corresponding one of the proximity sensors 14, 15, and 16 and performs individual air-conditioning for the rear-seat (individual air-conditioning for the rear-seat On).

When there is an occupant in the rear-seat, the controller 20 can adjust the amount of air in accordance with the number of occupants to be supplied to the rear-seat by controlling the air conditioning system 30.

For example, when there are (three) occupants in the rear-seat, a high level for supplying a large amount of air for air-conditioning (cooling/heating) is applied, or when there is two occupants in the rear-seat, a medium level for supplying a middle amount of air for air-conditioning is applied, or when there is one occupant in the rear-seat, a low level for supplying a small amount of air for air-conditioning is applied.

The number of occupants can be determined from the sum of the sensor values of the proximity sensors 14, 15, and 16, which can be expressed as follows.

Sum of sensor values of proximity sensors 14, 15, and 16: (A+A')+(B+B')+(C+C')

Figure 5:
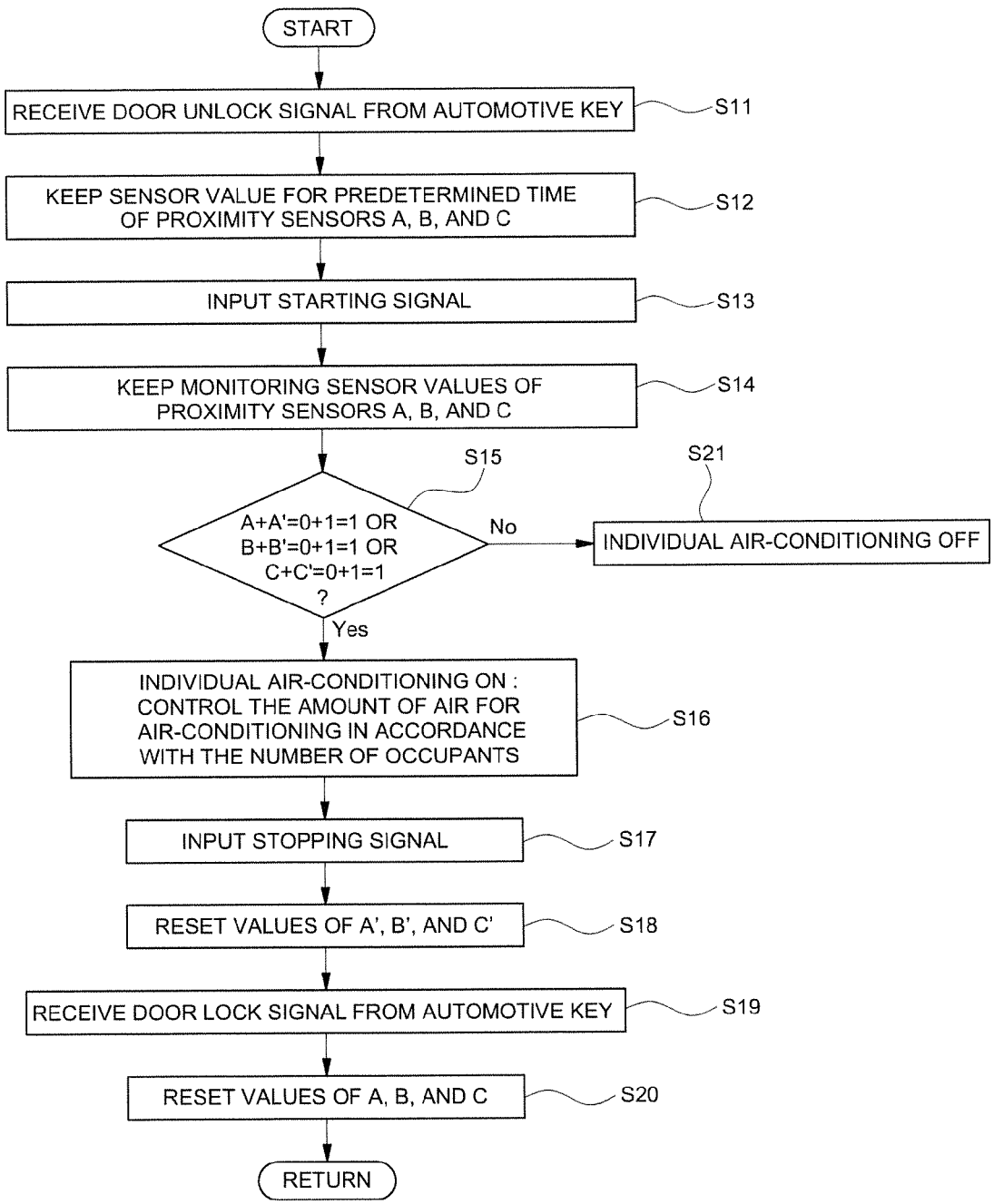
FIG. 5 is a flowchart illustrating a process of controlling air-conditioning according to the present disclosure.

As for (A+A')+(B+B')+(C+C')=(0+1)+(0+1)+(0+1)=3, high-level air-conditioning for three occupants As for (A+A')+(B+B')+(C+C')=(0+1)+(0+1)+(0+0)=2, medium-level air-conditioning for two occupants As for (A+A')+(B+B')+(C+C')=(0+1)+(0+0)+(0+0)=1, low-level air-conditioning for one occupant FIG. 5 is a flowchart illustrating an air-conditioning process according to the present disclosure, in which when the controller 20 receives a door unlock signal from the automotive key 11 (S11), it stores sensor values of the proximity sensors (A, B, and C) 14, 15, and 16 (S12) for a predetermined period of time.

Thereafter, when a starting signal is received (S13), the sensor values of the proximity sensors 14, 15, and 16 are monitored (S14), and for A+A'=0+1=1, B+B'=0+1=1, or C+C'=0+1=1. Then, individual air-conditioning for a rear-seat is performed, and the amount of air is adjusted depends on the number of occupants (S14 and S15).

Thereafter, when a stopping signal is received (S17), the values A', B', and C' are reset to 0 (S18), and when a door lock signal is received (S19), the values A, B, and C are reset to 0 (S20).

When the values A+A', B+B', and C+C' are all 0 or at least any one of them is 2 after a starting signal is input, the individual air-conditioning for the rear-seats is not performed (individual air-conditioning for the rear-seat Off) (S21).

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for detecting an occupant in a vehicle, comprising:
   a proximity sensor disposed in a back of a seat in the vehicle, the proximity sensor detecting an object;
   an automotive key locking and unlocking a door;
   a starter starting and stopping an engine of the vehicle; and
   a controller configured to determine whether the occupant is in the seat based on sensor values of the proximity sensor, a door unlock signal from the automotive key, and a starting signal from the starter,
   wherein the controller stores a first sensor value provided by the proximity sensor when the door unlock signal is received from the automotive key, and determines whether the occupant is in the seat based on the first stored sensor value and a second sensor value provided by the proximity sensor after the starting signal is input from the starter.

2. The system of claim 1, wherein the proximity sensor is disposed at an upper portion of the back of seat.

3. The system of claim 1, the proximity sensor is installed at a passenger seat in the vehicle.

4. The system of claim 1, wherein the first sensor value is stored for a predetermined period of time after receiving the door unlock signal.

5. The system of claim 1, wherein the proximity sensor is installed at a left rear-seat, a middle rear-seat, and a right rear-seat in the vehicle, and
   the controller determines whether the occupant is in the left, middle, and right rear-seats based on the first and second sensor values of the proximity sensor.

6. The system of claim 1, wherein the controller determines that the object is in the seat, which is not the occupant, when the first stored sensor value corresponds to a detection value of the object and when the second sensor value corresponds to a detection value of the object.

7. The system of claim 1, further comprising:
   a door switch for sensing whether the door is open,
   wherein the controller determines that the occupant is in the seat when the second sensor value corresponds to a detection value of the object and when the second sensor value corresponds to the detection value of the object, without a door open signal input from the door switch after receiving a stopping signal.

8. The system of claim 1, wherein the controller determines that the occupant is in the seat, when the first stored sensor value corresponds to a non-detection value of the object and the second sensor value corresponds to a detection value of the object.

9. The system of claim 8, wherein the controller resets the first and second sensor values of the proximity sensor to correspond to the non-detection value of the object after receiving a lock signal from the automotive key.

10. A method for controlling air conditioning of a vehicle by determining whether an occupant is in a seat, the method comprising steps of:
    receiving, by a controller, a door unlock signal from an automotive key;
    after the step of receiving the door unlock signal, storing a first sensor value provided by a proximity sensor when the door unlock signal is received from the automotive key;
    receiving, by the controller, a starting signal from a starter; and performing, by the controller, individual air-conditioning when the occupant is in the seat, wherein whether the occupant is in the seat is determined based on the stored first sensor value, and a second sensor value provided by the proximity sensor after inputting the starting signal which is received from the starter.

11. The method of claim 10, further comprising:

sensing, by a door switch, whether a door is open, wherein the controller determines that the occupant is in the seat, when the first sensor value corresponds to a detection value of an object and when the second sensor value corresponds to the detection value of the object, without a door open signal input from the door switch after receiving a stopping signal.

12. The method of claim 10, further comprising, before the step of performing:

determining whether the occupant is in a left rear-seat, a middle rear-seat, and a right rear-seat in a vehicle based on the first and second sensor values of the proximity sensor which is installed at each back of the left, middle, and right rear-seats.

13. The method of claim 12, wherein the step of performing comprises:

adjusting an amount of air for the individual air-conditioning for the left, middle, and right rear-seats in accordance with a number of occupants when the occupant is in the seat.

14. The method of claim 10, wherein an object, which is not the occupant, is in the seat, when the first stored sensor value corresponds to a detection value of the object and the second sensor value corresponds to the detection value of the object.

15. The method of claim 10, wherein the step of performing the individual air-conditioning is performed to a passenger seat, when the proximity sensor is installed at the passenger seat and the occupant is in the passenger seat.

16. The method of claim 10, wherein the occupant is in the seat, when the first stored sensor value corresponds to a non-detection value of an object and the second sensor value corresponds to a detection value of the object.

17. The method of claim 16, wherein the first and second sensor values of the proximity sensor are reset to the non-detection value of the object, when a lock signal is received from the automotive key.

* * * * *